United States Patent [19]
Hein

[11] Patent Number: 5,997,951
[45] Date of Patent: Dec. 7, 1999

[54] METHOD OF TREATING FIBERGLASS BOAT HULLS TO REPAIR, PREVENT AND RETARD BLISTERS

[75] Inventor: Gary L. Hein, Oakley, Ill.

[73] Assignee: Lincoln Diagnostics, Inc., Decatur, Ill.

[21] Appl. No.: 08/976,861

[22] Filed: Nov. 24, 1997

[51] Int. Cl.⁶ ........................................ B05D 3/00
[52] U.S. Cl. ........................ 427/299; 427/355; 427/407.3; 427/421
[58] Field of Search ..................................... 427/307, 355, 427/407.3, 421, 299

[56] References Cited

U.S. PATENT DOCUMENTS 4,282,822   8/1981   Jackson ................................. 114/222
4,360,384   11/1982  McKaveney et al. ................. 106/1.12

*Primary Examiner*—Bernard Pianalto
*Attorney, Agent, or Firm*—Cook, Alex, McFarron, Manzo Cummings & Mehler, Ltd.

[57] ABSTRACT

A solution or dispersion of polystyrene is used to treat the submergible surfaces of fiberglass boat hulls to prevent or alleviate blistering. With newly constructed fiberglass hulls polystyrene paint is applied either directly to the fiberglass surfaces or to a gelcoat protective surface applied over fiberglass. In the case of existing fiberglass hulls on which blisters have formed, the blisters are excised, filled with an epoxy resin or other fairing compound and ground smooth. Polystyrene paint is applied either to the blistered areas or larger areas after sanding.

9 Claims, No Drawings

METHOD OF TREATING FIBERGLASS BOAT HULLS TO REPAIR, PREVENT AND RETARD BLISTERS

BACKGROUND AND DESCRIPTION OF THE INVENTION

This invention relates, generally, to a method of treating at least the submergible surfaces of a fiberglass boat hull so as to repair, prevent or retard the formation of blisters thereon. For a number of years fiberglass has been extensively used for constructing boat hulls. Initially, fiberglass gained rapid acceptance as a preferred material for the construction of boat hulls because it was economical to use, was highly durable and resistant to damage, required only low maintenance, was attractive in appearance and was readily treated with anti-fouling materials. However, after boats with fiberglass hulls had been in use for several years, particularly those left in the water over long periods, it became evident that the fiberglass hulls were subject to the formation of blisters which, in addition to being unsightly, could, if left untreated, ultimately jeopardize the integrity of the fiberglass boat hulls.

It was soon determined that the blisters resulted from water penetrating the gelcoat on the exposed submergible surfaces of the fiberglass boat hulls on through to the underlying laminate. Thereafter, the water migrates into the fiberglass and pressure pockets form which result in the formation of the blisters between the gelcoat and the matte of the fiberglass. In some cases the blisters form in isolated or scattered areas and are relatively few in number with respect to the overall submergible surface. In other cases the blisters form throughout the entire submergible surfaces. In either case, if the blisters are left unattended water will continue to permeate and seep through the matte and, in some instances, into the woven roving, which is the structural portion of the fiberglass layup. Thus, while the blisters are initially objectionable for cosmetic reasons, they are the symptom of more serious problems to come, since, if the water permeation problem is not corrected, delamination of the fiberglass layers will occur.

Currently, there are essentially two methods used to repair fiberglass boat hulls on which blisters have formed. If the blisters are not extensive and if the water has not permeated the matte portion of the fiberglass, the blisters are usually ground off, the resulting "pot holes" or excised areas are filled with epoxy resin, and then faired to a smooth surface. Thereafter, an epoxy bottom coating that contains platelets as moisture barriers is applied over the repaired areas. A primer is then applied to the boat bottom which is then painted with anti-fouling paint. Rarely does this type of repair last very long. In most cases, if the repaired boat is used under the same conditions as before, the bottom will re-blister within a period of about two years and generally the re-blistering will then involve a larger area, or perhaps the entire bottom.

In the case of fiberglass boat hulls on which blisters have formed in large areas or perhaps over the entire bottom, the gelcoat protective barrier is taken off with a planer, or otherwise removed, down to the bare fiberglass matte. The bottom is then allowed to dry for a period ranging from several weeks to several months as may be required. When the fiberglass matte is dry, the entire bottom receives the following treatment:

a. Spots that have been ground out to get rid of moisture are filled with epoxy fairing compound and smoothed out to the bottom contour.

b. After proper preparation, a clear epoxy coating is applied to serve as a sealant.

c. After the sealant cures, several coats of epoxy base moisture barrier are applied to the bottom. Such epoxy moisture barrier generally consists of an epoxy resin with platelets suspended in it. By applying several coats, the platelets overlap one another and provide a moisture barrier.

The latter type of repair of the entire bottom of a boat is very costly, takes the boat out of use for an extended period and will impede the permeation of water for a period of only two to three years. Almost always, if the boat is used under the same conditions as before, the bottom re-blisters and the overall treatment of the bottom must be repeated.

The object of the invention, generally stated, is the provision of economical and practical methods of treating newly constructed fiberglass boat hulls and repairing fiberglass boat hulls on the bottoms or submergible surfaces on which blisters have formed, so as to prevent, retard and/or repair the formation of blisters.

DETAILED DESCRIPTION OF THE INVENTION

In accordance with the present invention a method of treating blisters in limited or isolated areas of a fiberglass boat hull as well as a method of treating a fiberglass boat hull on which blisters have formed in large areas or over the entire submergible bottom surface are provided. These methods are based on treating the properly prepared afflicted blistered areas with a dispersion or solution of polystyrene in a suitable volatile vehicle so as to deposit a protective layer or coating of polystyrene on the afflicted areas or an entire bottom surface. The bottom of a new fiberglass boat hull may be treated in the same general way so as to prevent or greatly retard the formation of blisters thereon. Xylol and lacquer thinner have been found to be the preferred vehicle or solvent. The polystyrene is used in a concentration such that the resulting preparation has the consistency of ordinary paint and may be referred to as "polystyrene paint." The polystyrene paint may be applied in any of the ways in which paints are usually applied such as by brush, roller, dipping or spraying.

In the case of newly constructed fiberglass boat hulls the polystyrene paint can be applied either directly to the fiberglass exterior surface or to a gelcoat protective surface applied over the fiberglass. Desirably, the treatment with polystyrene paint will be such as to deposit or build up a surface coating of polystyrene having a thickness of at least about 20 mils. After the polystyrene coating has been applied to the desired thickness and cured or dried, primer is then applied over the polystyrene surface and an appropriate anti-fouling paint applied over the primer. The treatment of newly constructed fiberglass boat hulls according to this method provides a very effective water barrier in both fresh and salt water and prevents, or greatly impedes or prevents, the permeation of water through the gelcoat or other protective coating.

In treating a fiberglass boat hull on which minimal blistering has occurred over limited areas of the bottom and water has permeated only through the gelcoat, the raised blisters are cut out or excised with a sharp instrument or ground off, leaving a "pock" or excised area. The pocks or excised areas, including their edges, are ground out to the extent of reaching where there is a good bond between the gelcoat and the fiberglass. The prepared holes, pocks or excised areas are filled with an appropriate fairing compound such as an epoxy resin, until the compound is flush with the adjacent overall bottom surface. After the excised or cut out blister areas have been thus prepared the gelcoat on the entire bottom is then sanded clean in preparation for the application of polystyrene paint so as to leave a residual protective coating of polystyrene. After the polystyrene coating has been applied to the desired thickness, e.g. at least about 20 mils, and dried, primer can then be applied followed by anti-fouling paint.

In places where blistering has occurred over the entire submergible bottom surface of a fiberglass hull or at least over large general areas of the hull, all of the gelcoat is removed from the bottom by sandblasting or the use of a peeling apparatus of known type. After removal of the gelcoat the exposed surface will be bare fiberglass. If water has not permeated the fiberglass, the bottom is dried out, prepared properly, and then coated with polystyrene paint as described above. If water has permeated the fiberglass in certain areas, the high moisture bearing areas are ground out, in some cases down to the woven roving, which constitutes most of the structural integrity of the fiberglass. The bottom of the boat, including the high moisture areas, is allowed to dry out to the point where the moisture content of the bottom is not appreciably higher than that of the fiberglass above the waterline. The drying procedure can be greatly accelerated by the use of infrared heat. When the bottom is sufficiently dry, the ground out or excised areas are faired in with a suitable fairing compound to the extent that they are flush with the remainder of the bottom surface. The thus prepared entire bottom surface is in condition for the application of polystyrene paint to provide a residual polystyrene coating of a thickness of at least about 20 mils. Thereafter, the bottom is primed and coated with anti-fouling paint.

What is claimed is:

1. The method of preventing or retarding the formation of blisters on the submergible exterior surfaces of the fiberglass hull of a boat which comprises applying thereto a residual coating of polystyrene.

2. The method of claim 1 wherein the polystyrene is dispersed in a volatile vehicle as applied and is allowed to dry so as to leave said residual coating of polystyrene.

3. The method of claim 2 wherein said vehicle is primarily a member selected from the group comprising xylol and lacquer thinner.

4. The method of claim 2 wherein the hull of the boat is newly constructed and has exposed gelcoat on its submergible exterior surfaces over which said residual coating of polystyrene is applied.

5. The method of claim 4 wherein said residual coating of polystyrene is applied to a thickness of at least about 20 mils.

6. The method of claim 2 wherein the hull of said boat has exposed gelcoat on its submergible exterior surfaces in which blisters have formed in limited areas with water permeating only through the gelcoat to the fiberglass matte and which blisters have been excised and the resulting excised areas filled flush with a faring compound, after which said gelcoat on at least the entire submergible surfaces is sanded clean before said residual polystyrene coating is applied thereto.

7. The method of claim 6 wherein said residual coating of polystyrene is applied to a thickness of at least about 20 mils.

8. The method of repairing the submergible surface of the fiberglass hull of a boat having a layer of gelcoat thereon in which blisters have formed and water has permeated in substantially all areas in accordance with the method of claim 2 which comprises, removing said gelcoat so as to expose the bare fiberglass and applying thereto a residual coating of polystyrene.

9. The method of claim 8 wherein said residual coating of polystyrene has a thickness of at least about 20 mils.

\* \* \* \* \*